US009689699B2

(12) United States Patent
Nishikawa et al.

(10) Patent No.: US 9,689,699 B2
(45) Date of Patent: *Jun. 27, 2017

(54) INTERNATIONALIZATION DURING NAVIGATION

(71) Applicant: International Business Machines Corporation, Armonk, NY (US)

(72) Inventors: Hirofumi Nishikawa, Tokyo (JP); Tomohiro Shioya, Tokyo (JP); Kei Sugano, Tokyo (JP); Shoichiro Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/140,677

(22) Filed: Apr. 28, 2016

(65) Prior Publication Data

US 2017/0059349 A1    Mar. 2, 2017

Related U.S. Application Data

(63) Continuation of application No. 14/833,455, filed on Aug. 24, 2015.

(51) Int. Cl.
G01C 21/36    (2006.01)
(52) U.S. Cl.
CPC ..... *G01C 21/3626* (2013.01); *G01C 21/3644* (2013.01)
(58) Field of Classification Search
CPC .............. G01C 21/3626; G01C 21/3644
See application file for complete search history.

(56) References Cited

U.S. PATENT DOCUMENTS

| | | | | | |
|---|---|---|---|---|---|
| 5,293,584 | A | * | 3/1994 | Brown | G10L 15/18 704/200 |
| 5,815,196 | A | * | 9/1998 | Alshawi | H04N 7/142 348/14.01 |
| 5,884,247 | A | * | 3/1999 | Christy | G06F 17/2872 704/4 |
| 6,301,554 | B1 | * | 10/2001 | Christy | G06F 17/271 704/4 |

(Continued)

FOREIGN PATENT DOCUMENTS

| | | |
|---|---|---|
| JP | 08124092 A | 5/1996 |
| JP | 201453095 A | 8/2014 |

OTHER PUBLICATIONS

"Kotoku-in" Wikipedia, the free encyclopedia, page last modified on Mar. 25, 2015, at 20:45, 4 pages, <https://en.wikipedia.org/wiki/Kotoku-in>.

(Continued)

*Primary Examiner* — Calvin Cheung
(74) *Attorney, Agent, or Firm* — Brian M. Restauro; Alexa L. Ashworth

(57) ABSTRACT

Embodiments of the present invention provide systems and methods for internationalization of real-world features during navigation. The method includes receiving a request for navigation to a landmark in a particular language. The method further includes retrieving keywords from a database associated with the landmark, and scoring the keywords based on their level of recognition to a user. The highest ranked keywords are then sent to the user to navigate to the landmark.

6 Claims, 8 Drawing Sheets

(56) References Cited

U.S. PATENT DOCUMENTS

| | | | | |
|---|---|---|---|---|
| 6,567,778 | B1* | 5/2003 | Chao Chang | G06F 17/278 704/257 |
| 7,269,504 | B2 | 9/2007 | Gardner et al. | |
| 7,343,290 | B2* | 3/2008 | Breuer | H04M 3/493 704/2 |
| 7,424,363 | B2 | 9/2008 | Cheng et al. | |
| 7,912,637 | B2 | 3/2011 | Horvitz et al. | |
| 8,073,677 | B2* | 12/2011 | Furihata | G06F 17/289 704/2 |
| 8,527,258 | B2* | 9/2013 | Kim | G10L 13/00 704/2 |
| 8,909,771 | B2* | 12/2014 | Heath | G06Q 30/02 705/39 |
| 9,153,229 | B2* | 10/2015 | Xu | G10L 15/01 |
| 2002/0111791 | A1* | 8/2002 | Candelore | G06F 17/2765 704/7 |
| 2005/0080632 | A1* | 4/2005 | Endo | G10L 15/08 704/277 |
| 2005/0114114 | A1* | 5/2005 | Rudolph | G06F 17/2735 704/10 |
| 2006/0025995 | A1* | 2/2006 | Erhart | G10L 15/1822 704/239 |
| 2006/0053012 | A1* | 3/2006 | Eayrs | G10L 21/06 704/251 |
| 2006/0069562 | A1* | 3/2006 | Adams | G09B 5/00 704/251 |
| 2006/0206331 | A1* | 9/2006 | Hennecke | G10L 15/187 704/254 |
| 2007/0033043 | A1* | 2/2007 | Hyakumoto | G10L 15/1815 704/255 |
| 2007/0162281 | A1* | 7/2007 | Saitoh | G10L 15/197 704/251 |
| 2007/0219776 | A1* | 9/2007 | Gamon | G06F 17/27 704/9 |
| 2007/0239423 | A1* | 10/2007 | Miller | G06F 17/2818 704/2 |
| 2008/0033720 | A1* | 2/2008 | Kankar | G10L 15/1822 704/235 |
| 2008/0077386 | A1* | 3/2008 | Gao | G06F 17/28 704/3 |
| 2008/0275699 | A1* | 11/2008 | Mozer | 704/231 |
| 2009/0144049 | A1* | 6/2009 | Haddad | G06F 17/2223 704/3 |
| 2009/0234650 | A1* | 9/2009 | Yano | G10L 15/22 704/251 |
| 2009/0248395 | A1* | 10/2009 | Alewine | G10L 13/08 704/7 |
| 2009/0259466 | A1* | 10/2009 | Stubley | G10L 15/08 704/240 |
| 2010/0057435 | A1* | 3/2010 | Kent | G06F 17/289 704/3 |
| 2010/0088190 | A1* | 4/2010 | Fliess | G06Q 30/06 705/26.1 |
| 2010/0106497 | A1* | 4/2010 | Phillips | G10L 15/30 704/231 |
| 2010/0169073 | A1* | 7/2010 | Almagro | G10L 15/26 704/3 |
| 2010/0204978 | A1* | 8/2010 | Gao | G10L 15/26 704/2 |
| 2011/0046953 | A1* | 2/2011 | Arun | G10L 15/187 704/255 |
| 2011/0191100 | A1* | 8/2011 | Okabe | G10L 15/187 704/10 |
| 2011/0218806 | A1* | 9/2011 | Alewine | G10L 13/08 704/251 |
| 2012/0179448 | A1* | 7/2012 | Gupta | H04W 4/028 704/2 |
| 2013/0144621 | A1* | 6/2013 | Chen | G09B 7/02 704/246 |
| 2013/0204627 | A1* | 8/2013 | Schalk | G01C 21/3608 704/270.1 |
| 2013/0282360 | A1* | 10/2013 | Shimota | G06F 17/28 704/7 |
| 2014/0214414 | A1* | 7/2014 | Poliak | G10L 21/0208 704/228 |
| 2015/0088485 | A1* | 3/2015 | Alhabobi | H04L 65/403 704/2 |
| 2015/0127339 | A1* | 5/2015 | Tjalve | G10L 15/005 704/235 |
| 2015/0127349 | A1* | 5/2015 | Agiomyrgiannakis | G10L 15/142 704/266 |
| 2015/0134322 | A1* | 5/2015 | Cuthbert | G06F 17/289 704/3 |
| 2015/0186530 | A1* | 7/2015 | Mansour | G06F 17/3087 707/706 |
| 2016/0132291 | A1* | 5/2016 | Bai | G06F 3/04883 715/728 |

OTHER PUBLICATIONS

"Method and System for Supplementing Driving Directions for People Navigating in Unfamiliar Areas", An IP.com Prior Art Database Technical Disclosure, IP.com No. 000239609, IP.com Electronic Publication: Nov. 19, 2014, pp. 1-4.

"Tempuramarunaka", Printed Aug. 24, 2015, 3 pages, <http://tabelog.com/en/tokyo/A1313/A131301/13082641/?rvwid=3755279>.

U.S. Appl. No. 14/833,455, filed Aug. 24, 2015; Entitled "Internationalization During Navigation".

List of IBM Patents or Patent Applications Treated as Related; Dated Apr. 28, 2016; 2 pages.

* cited by examiner

500

| LANGUAGE | REGION | SNS LOCAL NAME | SNS ENG. NAME | TYPE | ADDRESS |
|---|---|---|---|---|---|
| N/A | N/A | TWITTER | TWITTER | GENERAL | HTTP:// TWITTER.COM |
| N/A | N/A | FACEBOOK | FACEBOOK | GENERAL | HTTP:// FACEBOOK.COM |
| JA | JA | 食べログ | TABE-LOG | FOOD | HTTP:// TABELOG.COM |
| ZH | CN | 大衆点評 | DIANPING | FOOD | HTTP:// WWW.DIANPING. COM |
| EN | US | YELP | YELP | FOOD | WWW.YELP.COM |

510

| LATITUDE | LONGITUDE | LABEL | LANG. | REGION | KEYWORD | EXTRACTION SNS | LAST UPDATE |
|---|---|---|---|---|---|---|---|
| 35.685175 | 139.752799 | 皇居 | JA | JP | 城跡, 天皇, ... | FACEBOOK | 01/04/15 |
| 35.685175 | 139.752799 | 皇居 | ZH | CN | 城跡, 天皇, ... | FACEBOOK | 01/04/15 |
| 35.685175 | 139.752799 | IMPERIAL PALACE | EN | US | RUINS OF A CASTLE, EMPEROR,... | FACEBOOK | 01/04/15 |

| CRITERIA | LANG. | REGION | CRITERIA SAMPLING VALUE |
|---|---|---|---|
| LANGUAGE | JA | JP | KANJI, ALPHABET, SIMPLIFIED ... |
| LANGUAGE | ZH | CN | KANJI, ALPHABET, SIMPLIFIED ... |
| LANGUAGE | EN | US | ALPHABET ... |
| BRAND NAME | JA | JP | TOYOTA, HONDA, SONY, ... |
| BRAND NAME | ZH | CN | LENOVO, HAIER, ... |
| BRAND NAME | EN | US | GE, IBM, COCA-COLA, ... |

| LANG. | REGION | VALUE | CRITERIA | SCORE |
|---|---|---|---|---|
| JA | JP | KANJI | LANGUAGE | 100 |
| JA | JP | ALPHABET | LANGUAGE | 40 |
| JA | JP | SIMPLIFIED | LANGUAGE | 40 |
| ZH | CN | SIMPLIFIED | LANGUAGE | 100 |
| ZH | CN | ALPHABET | LANGUAGE | 20 |
| ZH | CN | KANJI | LANGUAGE | 40 |
| EN | US | ALPHABET | LANGUAGE | 100 |

FIG. 5D

INTERNATIONALIZATION DURING NAVIGATION

BACKGROUND OF THE INVENTION

The present invention relates generally to the field of navigation, and more particularly to the internationalization of real-world features during navigation.

When a user travels to a new location, directions to assist in finding routes, landmarks, and translating the destination language are often used. Translators, which translate the language of a travel destination country into the language of the native country of a user, are known. Often, the contents of the translation may still be difficult for the user to understand.

SUMMARY

According to an embodiment of the present invention, a method for internationalization of navigation is provided, the method comprising: receiving, by one or more processors, from a requestor, a request comprising a target destination and a native language; retrieving, by one or more processors, from a database, a plurality of keywords, wherein the plurality of keywords are associated with the native language and a destination language; scoring, by one or more processors, each of the plurality of keywords; determining, by one or more processors, whether a score associated with each of the plurality of keywords exceeds a threshold value; responsive to determining that a score associated with each of the plurality of keywords exceeds the threshold value, translating, by one or more processors, the plurality of keywords from the destination language to the native language; and sending, by one or more processors, the translated plurality of keywords to the requestor, wherein the translated plurality of keywords are used to navigate to the target destination.

According to another embodiment of the present invention, a computer program product for internationalization of navigation is provided, the computer program product comprising: a computer readable storage medium and program instructions stored on the computer readable storage medium, the program instructions comprising: program instructions to receive, from a requestor, a request comprising a target destination and a native language; program instructions to retrieve, from a database, a plurality of keywords, wherein the plurality of keywords are associated with the native language and a destination language; program instructions to score each of the plurality of keywords; program instructions to determine whether a score associated with each of the plurality of keywords exceeds a threshold value; program instructions to, responsive to determining that a score associated with each of the plurality of keywords exceeds the threshold value, translate the plurality of keywords from the destination language to the native language; and program instructions to send the translated plurality of keywords to the requestor, wherein the translated plurality of keywords are used to navigate to the target destination.

According to another embodiment of the present invention, a computer system for internationalization of navigation is provided, the computer system comprising: one or more computer processors; one or more computer readable storage media; program instructions stored on the one or more computer readable storage media for execution by at least one of the one or more processors, the program instructions comprising: program instructions to receive, from a requestor, a request comprising a target destination and a native language; program instructions to retrieve, from a database, a plurality of keywords, wherein the plurality of keywords are associated with the native language and a destination language; program instructions to score each of the plurality of keywords; program instructions to determine whether a score associated with each of the plurality of keywords exceeds a threshold value; program instructions to, responsive to determining that a score associated with each of the plurality of keywords exceeds the threshold value, translate the plurality of keywords from the destination language to the native language; and program instructions to send the translated plurality of keywords to the requestor, wherein the translated plurality of keywords are used to navigate to the target destination.

BRIEF DESCRIPTION OF THE DRAWINGS

FIG. 4 depicts an example calculation of a level of recognition for keywords, in accordance with an embodiment of the present invention;

FIGS. 5A-D are example database tables, in accordance with an embodiment of the present invention;

DETAILED DESCRIPTION

Embodiments of the present invention provide systems and methods for extracting multiple features from a destination and its surroundings during navigation, using existing map and social media information, and translating the features into words that are recognizable by a user, based on the native country and/or language of the user.

Figure 1:
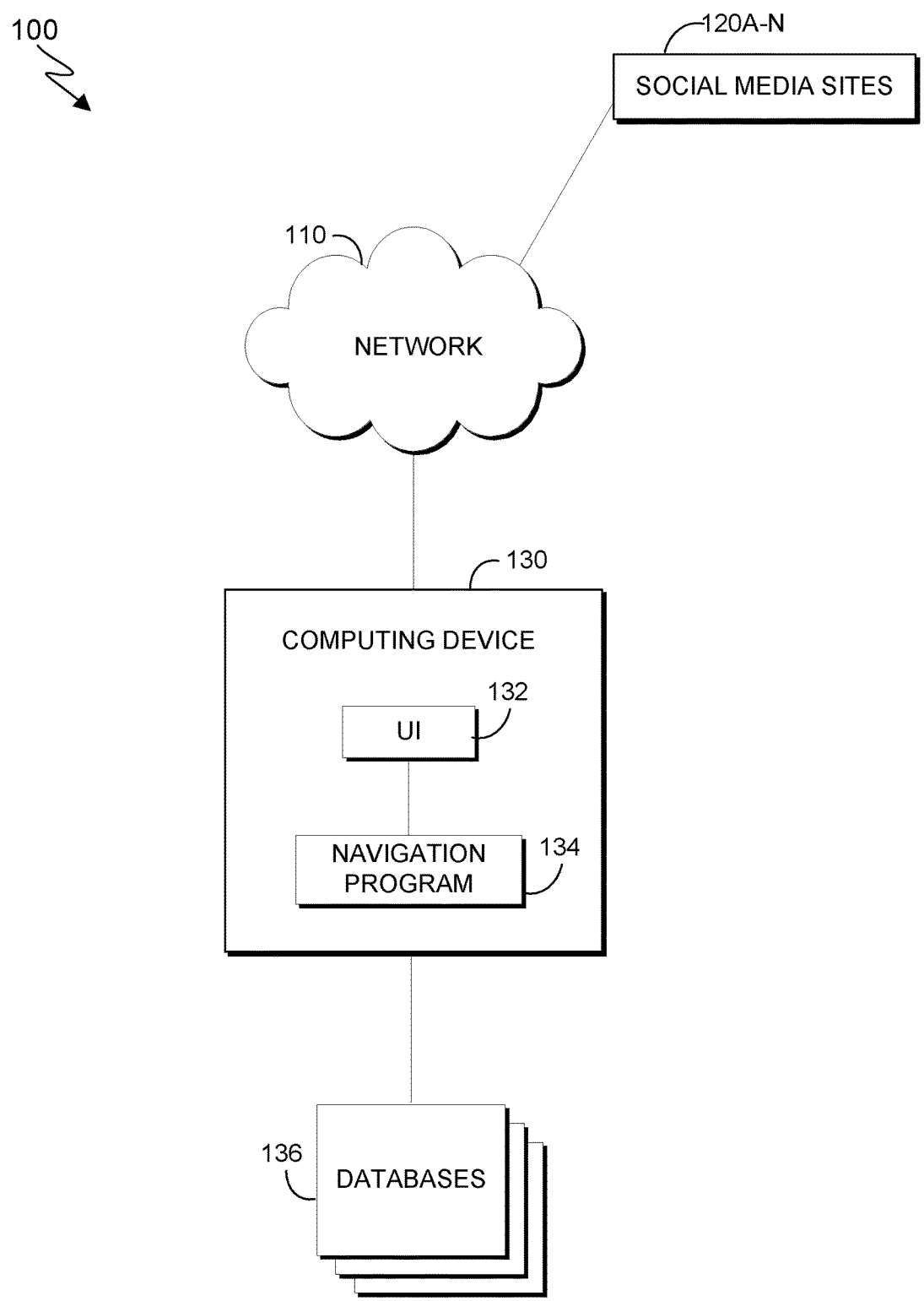
FIG. 1 depicts a block diagram illustrating a distributed data processing environment, in accordance with an embodiment of the present invention.

The present invention will now be described in detail with reference to the Figures. FIG. 1 depicts a block diagram illustrating a distributed data processing environment, generally designated 100, in accordance with an embodiment of the present invention. Modifications to distributed data processing environment 100 may be made by those skilled in the art without departing from the scope of the invention as recited by the claims. In an exemplary embodiment, distributed data processing environment 100 includes social media sites 120A-N and computing device 130, interconnected via network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communication and/or access between computing device 130 and social media sites 120A-N.

Social media sites 120A-N may be any existing social media sites from which features of a checkpoint or destination and the current surroundings may be extracted. For example, social media sites 120A-N may include blogs, Twitter, map information sites, Facebook, etc.

Computing device 130 includes user interface (UI) 132 and navigation program 134. In various embodiments of the present invention, computing device 130 can be a laptop computer, a tablet computer, a netbook computer, a personal computer (PC), a desktop computer, a personal digital assistant (PDA), a smart phone, a thin client, a wearable device, or any programmable electronic device capable of executing computer readable program instructions. Computing device 130 may include internal and external hardware components, as depicted and described in further detail with respect to FIG. 7.

UI 132 may be, for example, a graphical user interface (GUI) or a web user interface (WUI) and can display text, documents, web browser windows, user options, application interfaces, and instructions for operation, and includes the information (such as graphic, text, and sound) a program presents to a user and the control sequences the user employs to control the program. UI 132 is capable of receiving data, user commands, and data input modifications from a user. UI 132 is also capable of communicating with navigation program 134.

Navigation program 134 extracts features of a checkpoint or current destination from social media sites 120A-N during navigation, translates the extracted features into familiar words and expressions of the country of the user, and further uses the translated features for navigating the user to a destination. In this exemplary embodiment, navigation program 134 sorts feature points in accordance with an order of familiarity to the current user, translates higher ranking feature points into a user's home language, and uses determined highest ranking feature point keywords as navigation keywords.

Databases 136 may be one or more databases for storing navigation information. In this exemplary embodiment, databases 136 reside locally on computing device 130, however, it is to be understood that in other embodiments, databases 136 may be remote databases, accessed via a network, such as network 110. Databases 136 may include information such as social networking services (SNS) information (i.e., social networking sites) by country and/or language, keywords information, keywords by a street view, calculation criteria for keywords, and navigation characteristics by country and/or language from SNS.

Figure 2A:
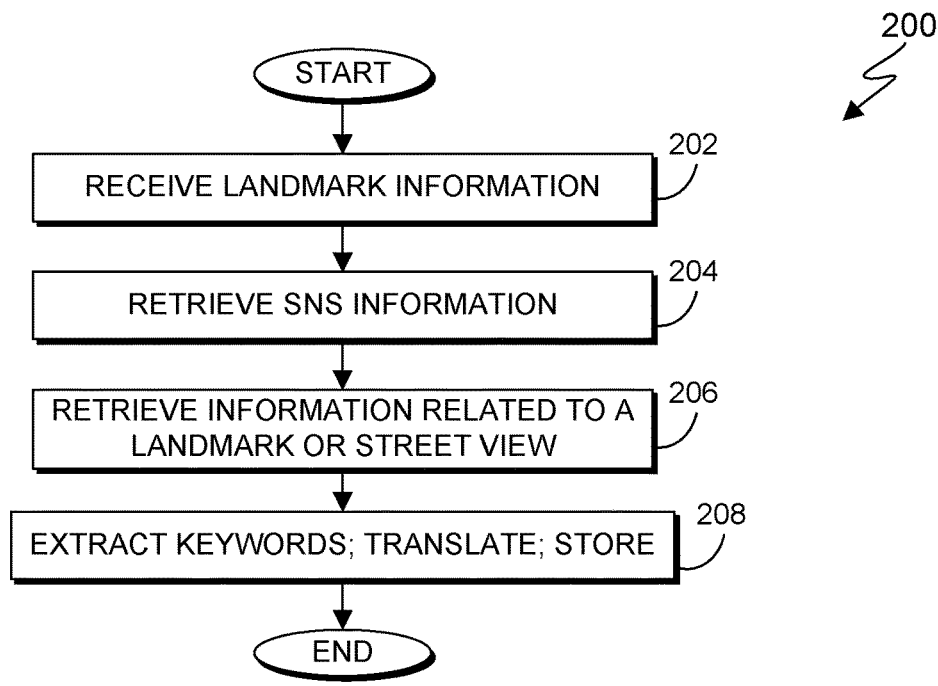
FIG. 2A depicts a flowchart illustrating operational steps for retrieving keywords and extracting information related to a home country or language of a user, in accordance with an embodiment of the present invention.

FIG. 2A depicts a flowchart 200 illustrating operational steps for retrieving keywords and extracting information related to a home country or language of a user, in accordance with an embodiment of the present invention.

In step 202, navigation program 134 receives landmark information. In this exemplary embodiment, navigation program 134 receives the latitude and longitude coordinates and/or the address of a landmark. The landmark information may be, for example, input by a user, retrieved from a field of view of a user, automatically retrieved from social media sites 120A-N (e.g., retrieved landmark from a blog), or retrieved from GPS or map information.

In step 204, navigation program 134 retrieves social networking services (SNS) information. In this exemplary embodiment, navigation program 134 retrieves SNS information from databases 136, based on the native country and/or language of the user. The SNS information database is depicted in further detail with respect to FIG. 5A.

In step 206, navigation program 134 retrieves information related to a landmark or street view. In this exemplary embodiment, navigation program 134 retrieves information from databases 136 related to a specified landmark. Databases 136 can store SNS information related to various regions, and navigation program 134 can retrieve the corresponding region information for the specified landmark. In this exemplary embodiment, navigation program 134 also retrieves the street view of the received specified landmark or address. Street view information is retrieved from a street view database of databases 136 (depicted further in FIG. 5B).

In step 208, navigation program 134 extracts keywords, translates the keywords, and stores the keywords. In this exemplary embodiment, navigation program 134 extracts the keywords of the received landmark using text mining. For example, for a user from the United States visiting the Imperial Palace landmark in Japan, navigation program 134 may extract, and translate from Japanese to English, the keywords 'ruins of a castle' and 'emperor'. The extracted keywords for the landmark are then stored in a keywords database of databases 136. In this exemplary embodiment, navigation program 134 also extracts the keywords of a landmark using image analysis (e.g., using the street view of the landmark). The extracted keywords from the image analysis are then translated to the native language of the user, and stored in a street view keywords database of databases 136 (depicted further in FIG. 5B).

Figure 2B:
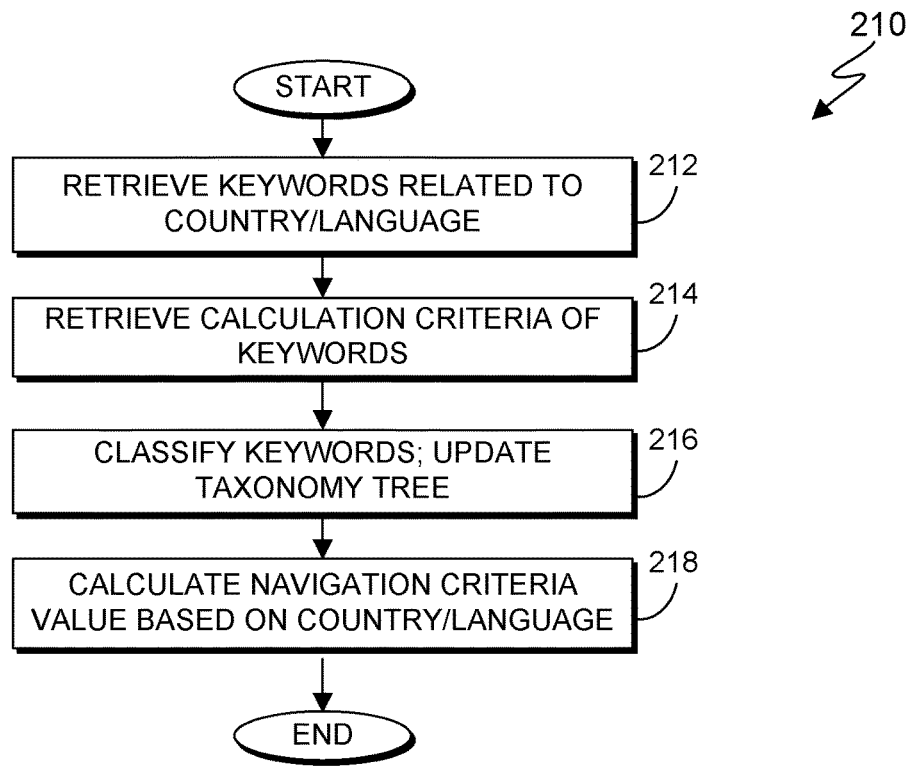
FIG. 2B depicts a flowchart illustrating operational steps for extracting and classifying keyword information, in accordance with an embodiment of the present invention.

FIG. 2B depicts a flowchart 210 illustrating operational steps for extracting and classifying keyword information, in accordance with an embodiment of the present invention.

In step 212, navigation program 134 retrieves keywords related to the country and/or language of the user. In this exemplary embodiment, navigation program 134 retrieves stored keywords from the keyword database of databases 136 (step 208 of FIG. 2A).

In step 214, navigation program 134 retrieves calculation criteria for the retrieved keywords of step 212. In this exemplary embodiment, calculation criteria for a set of keywords is stored in a database of databases 136 (depicted further in FIG. 5C), and is created using an existing corpus of navigation criteria by region. For example, criteria for a specific region may include a language, a brand name, and/or a shop name. In a region of the United States, the language is English and a recognized brand may be Chevrolet®, while in a region of Japan, the language is Japanese and a recognized brand may be Toyota®.

In step 216, navigation program 134 classifies the keywords and updates a taxonomy tree. In this exemplary embodiment, navigation program 134 classifies the keywords extracted from the keyword SNS database of databases 136, and adds them to a taxonomy tree, which is used to infer relationships between received keywords in the native language of the user (described in further detail with respect to FIG. 6).

In step 218, navigation program 134 calculates a navigation criteria value based on a native country and/or language of a current user. In this exemplary embodiment, navigation program 134 uses the retrieved calculation criteria for each keyword, and calculates a navigation criteria value based on a region. For example, if the criteria is 'language' and the region is 'Japan', a keyword written in Kanji may receive a score of '100' (i.e., easy to navigate for a native of Japan), while a keyword written in English may receive a score of '40' (i.e., not as relatively easy to navigate for a native of Japan). The calculated navigation criteria values are stored in a navigation characteristics database of databases 136 (navigation criteria values are further depicted in FIG. 5D).

Figure 2C:
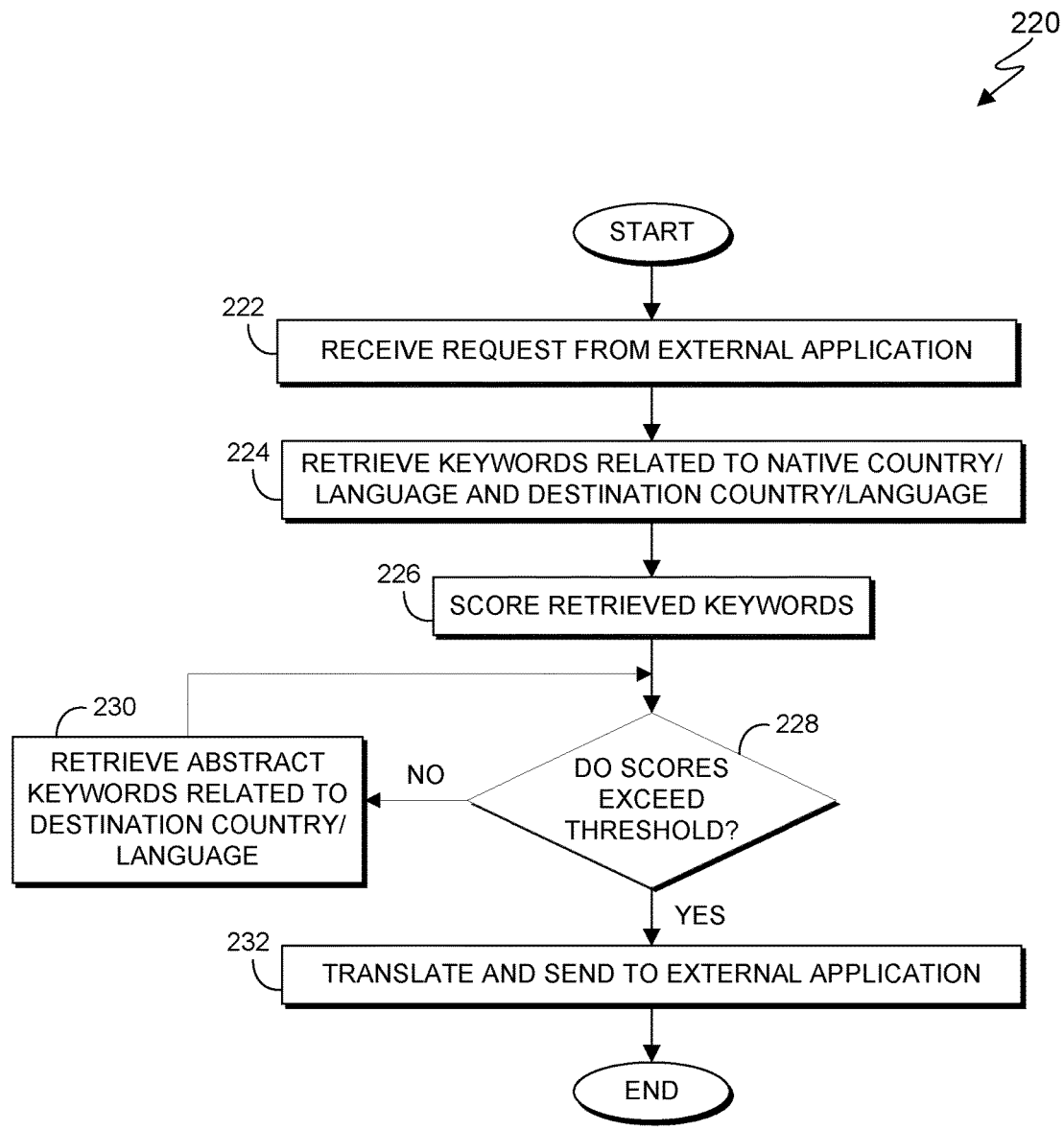
FIG. 2C depicts a flowchart illustrating operational steps for navigation using internationalization, in accordance with an embodiment of the present invention.

FIG. 2C depicts flowchart 220 illustrating operational steps for navigation using internationalization, in accordance with an embodiment of the present invention.

In step 222, navigation program 134 receives a request from an external application. In this exemplary embodiment, navigation program 134 receives a request in the form of coordinates of a destination (i.e., latitude and longitude of a destination) and the native country and/or language of the user. For example, navigation program 134 may receive a request for the coordinates of a location (e.g., a landmark) in Japan, and an indication that the home country of the user is the United States and that the native language of the user (i.e., most familiar language to the user) is English.

In step 224, navigation program 134 retrieves keywords related to the native country or language of the user and the destination country or language of the user. In this exemplary embodiment, navigation program 134 identifies the destination of the user (e.g., address, sightseeing location name, etc.) from the received coordinates. For example, navigation program 134 may identify that a user is at the Imperial Palace in Japan, and provide the address of the location, based on the received coordinates. Navigation program 134 then retrieves keywords from databases 136 which are recognizable to the user, based on the indicated native country and/or language of the user (e.g., English in the current example), as well as keywords of the destination language of the user (e.g., Japanese in the current example). For example, the keywords 'Emperor' and 'ruins of a castle' may be recognizable to English speakers from the United States that the location is the Imperial Palace of Japan.

In step 226, navigation program 134 scores the retrieved keywords. In this exemplary embodiment, navigation program 134 uses information stored in the navigation criteria values database of databases 136 to determine a score for each retrieved keyword. For example, a keyword score value may be based partially on a level of recognition of a keyword in a certain native country or language. The method for scoring retrieved keywords is described in further detail with respect to FIG. 4.

In step 228, navigation program 134 determines whether the keyword scores exceed a threshold. In this exemplary embodiment, navigation program 134 compares the determined score for each retrieved keyword to a predetermined threshold score value. The predetermined threshold score value may be based partially on a level of recognition in a native language of general feature information (i.e., color of a structure) and characteristic feature information (i.e., trademark logo) of the retrieved keywords.

If, in step 228, navigation program 134 determines that the keyword scores do not exceed a threshold, then, in step 230, navigation program 134 retrieves abstract keywords related to the destination country or language of the user. In this exemplary embodiment, keywords with a low score (i.e., below a predetermined threshold value) correspond to words with a low level of recognition in the native language of the user, which means there may not be any native language keywords directly corresponding to the destination language keywords. Thus, navigation program 134 then retrieves abstract keywords of the retrieved keywords in the destination language from a taxonomy tree, until the program identifies a keyword(s) in the native language of the user, which may be a candidate for a navigation keyword. This process is described in more detail with respect to FIG. 6.

If, in step 228, navigation program 134 determines that the scores do exceed a threshold, then, in step 232, navigation program 134 translates the corresponding keywords and sends the translated keywords to the requesting external application. In this exemplary embodiment, a keyword with a high score (i.e., exceeds a threshold score value) corresponds to a keyword with a high level of recognition in the indicated native language. When keywords with a high score value are determined, these keywords are then translated into the native language (i.e., the indicated language of the user) and sent to the original requesting application, which can use the translated keywords to fulfill a user request.

Figure 3A:
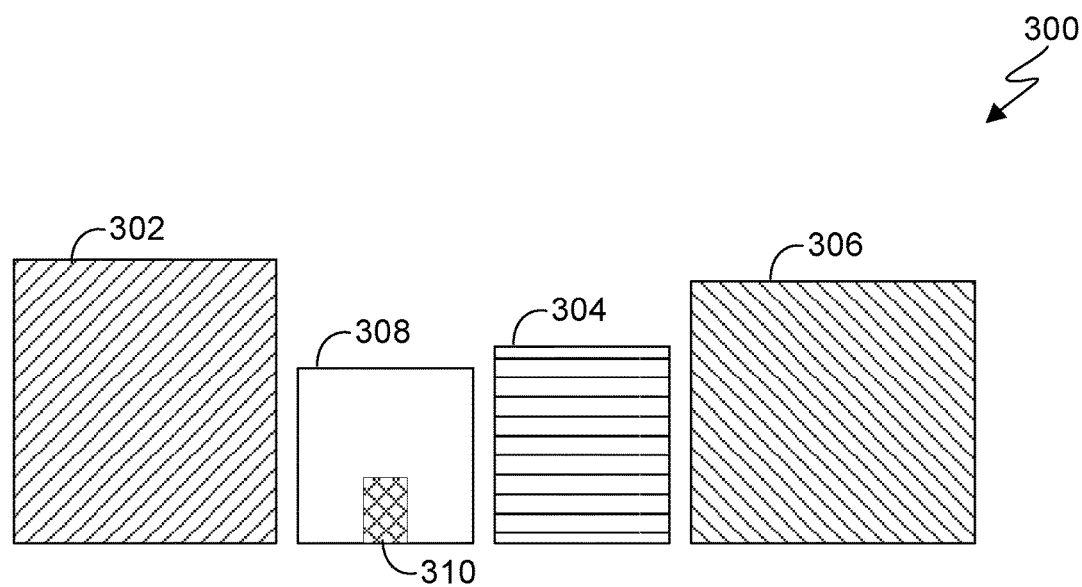
FIG. 3A depicts a block diagram of an example of making use of map information and social media to extract features of a destination, in accordance with an embodiment of the present invention.

FIG. 3A depicts a block diagram of an example of making use of map information and social media to extract features of a destination, in accordance with an embodiment of the present invention.

Map 300 depicts an example of a real-world location, including buildings 302, 304, 306, and 308. In this example, building 308 is the destination building. Navigation program 134 receives landmark information (i.e., step 202 of FIG. 2A) and retrieves SNS information based on the received landmark (i.e., step 204 of FIG. 2A). In this example, navigation program 134 receives the name (i.e., the destination landmark information) "Tempura-Maruchu", a restaurant in Japan, from an American native visiting Japan. Navigation program 134 mines social media sites 120A-N, and finds a food blog which describes and provides a review of the restaurant. In this example, from the food blog information, navigation program 134 mines information related to the landmark (i.e., step 206 of FIG. 2A). For example, navigation program 134 may extract, from the text of the food blog, the features of: 'an adjacent building is brown', the restaurant is located in a 'black building', and 'there is a purple shop curtain' at the front of the restaurant. A user can then easily navigate to destination building 308 (i.e., the restaurant) based on the extracted features of building 308 being a black colored building, its purple shop curtain 310, and it being adjacent to brown building 304.

Figure 3B:
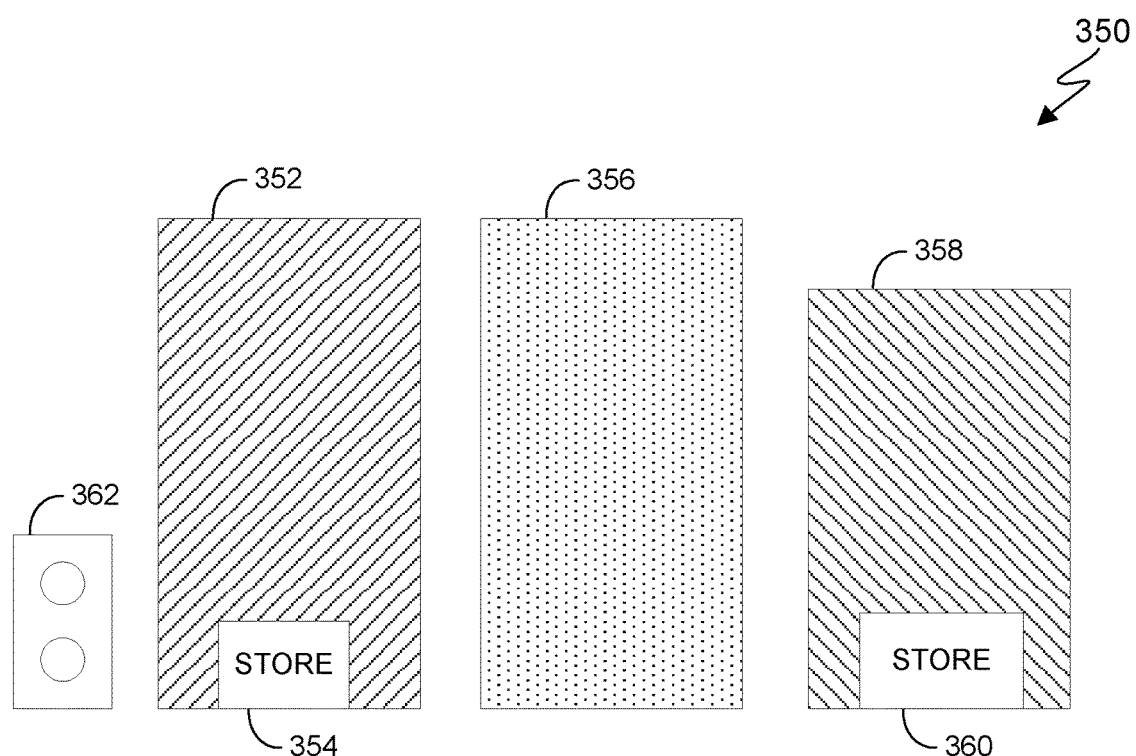
FIG. 3B depicts a block diagram of an example of internationalization with familiar words for the respective countries, in accordance with an embodiment of the present invention.

FIG. 3B depicts a block diagram of an example of internationalization with familiar words for the respective countries, in accordance with an embodiment of the present invention.

Map 350 depicts an example of a real-world location, including buildings 352, 356, 358, and traffic signal 362. In this example, the third floor of building 356 is the destination. Navigation program 134 retrieves keywords related to the native country and/or language of the current user and related to the destination country and/or language (i.e., step 224 of FIG. 2C) and scores the retrieved keywords based on a level of recognition (i.e., step 226 of FIG. 2C). In this example, navigation program 134 extracts certain features about the surroundings of a particular landmark (i.e., building 356). For example, navigation program 134 may extract the features of: a) an adjacent building is brown; b) an adjacent building is silver; c) a "Family Mart" store is in an adjacent building; d) a "Seven-Eleven" store is in an adjacent building; e) it is the second building after the traffic signal; and f) it is a flesh colored building. Navigation program 134 determines, from the indicated native language, the extracted features which may have the highest recognition for the particular user. For example, if the native language of the user is Japanese and the destination country is Japan, then navigation program 134 may describe the destination landmark using the keywords "third floor of the building which is between the Seven-Eleven (i.e., store 354) and the Family Mart (i.e., store 360)", as both the Seven-Eleven chain and the Family Mart chain are characteristic feature keywords with a high level of recognition to natives of Japan. In the same example, if the native language of the user is English, then navigation program 134 may describe the destination landmark using the keywords "third floor of the building between the Seven-Eleven (i.e., store 354) and the brown building (i.e., building 358)", as the level of recognition for the Seven-Eleven chain of stores is high, while the level of recognition for the Family Mart chain of stores is low for native English speakers. Using the same example, if the native country of the user is South Africa, then navigation program 134 may describe the destination landmark using the keywords "the building between the building (i.e., 352) next to the traffic signal (i.e., 362) and the brown building (i.e., 358)", as the level of recognition for both the Seven-Eleven and the Family Mart chain of stores is low for natives of South Africa. Using more common features, such as the color of a building and general structures (i.e., a traffic signal) are more readily recognizable to native South Africans in this example.

Figures 4, 5A:
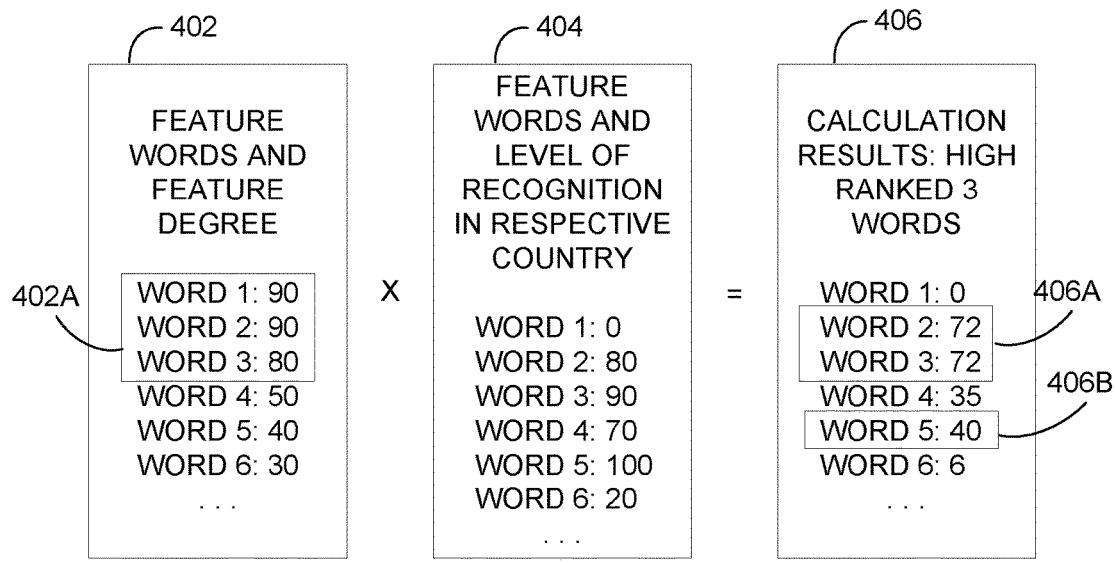

FIG. 4 depicts an example calculation of a level of recognition for keywords, in accordance with an embodiment of the present invention.

In this example, navigation program 134 calculates the scores of the retrieved keywords (step 226 of FIG. 2C). As depicted in FIG. 4, feature words 402 are retrieved from various social media sites 120A-N and assigned a feature degree, based partially on a recognition of general feature information, such as a color of a structure, the height of a structure, the presence/absence of traffic lights, etc. In this example the first three keywords 402A, words 1, 2, and 3 have the highest ranked feature degree (90, 90, and 80, respectively). The feature degree for the keywords is then multiplied by a level of recognition of the keywords in a native country, level of recognition 404. In this example, words 1 and 6 have a low level of recognition in the native language, while words 2, 3, and 5 have a high level of recognition. The level of recognition of a word in a native language may be determined based partially on characteristic feature information, such as store names, chain store names, trademarks, logos, etc. The product of feature words 402 and level of recognition 404 is calculation results 406, in which each of the keywords are ranked. In this exemplary embodiment, the highest ranked three words are then sent to a user in order to fulfill a request for landmark information. As depicted in FIG. 4, in this example, words 2, 3, and 5 are the highest ranked keywords, which means they have the highest level of recognition of features in the example native language, and thus are sent to a requesting user or application.

FIGS. 5A-D are example database tables, in accordance with an embodiment of the present invention.

Database table 500 depicts an example of SNS information based on the country or language of the user. As depicted in FIG. 5A, information associated with the language, region, SNS local name (e.g., Twitter, Facebook, etc.), SNS English name, type of the SNS name, and web address are stored. This information may be stored in databases 136, and may be retrieved by navigation program 134, based on the native country and/or language of the user (i.e., step 204 of FIG. 2A).

Database table 510 depicts an example of a keywords database of SNS information and of street view information. As depicted in FIG. 5B, information associated with the coordinates of a landmark (i.e., latitude and longitude), language, region, keywords, an extraction from SNS, and a last update date for the website from which the SNS information was extracted are stored. This information may be stored in databases 136 (i.e., steps 206 and 208 of FIG. 2A), and may be retrieved by navigation program 134 based on the native country and/or language of a requesting user (i.e., step 224 of FIG. 2C).

Database table 520 depicts an example of calculation criteria for a set of keywords. As depicted in FIG. 5C, information associated with the navigation criteria based on a region are stored. Navigation criteria may include a language, brand name, and shop name, etc., while a region and criteria based on the region are stored for each associated navigation criteria. The information associated with database table 520 is gathered from various sources of existing information, and may be retrieved by navigation program 134 based on a determined set of keywords (i.e., step 214 of FIG. 2B).

Database table 530 depicts an example of navigation characteristics based on a native country or language, from SNS. As depicted in FIG. 5D, information associated with a language, region, value, criteria, and a score for each are stored in the database. This information may be stored in databases 136 (i.e., step 218 of FIG. 2B) and retrieved by navigation program 134 in order to compare the characteristics of a native country or language to a set of keywords (i.e., step 228 of FIG. 2C).

Figure 6:
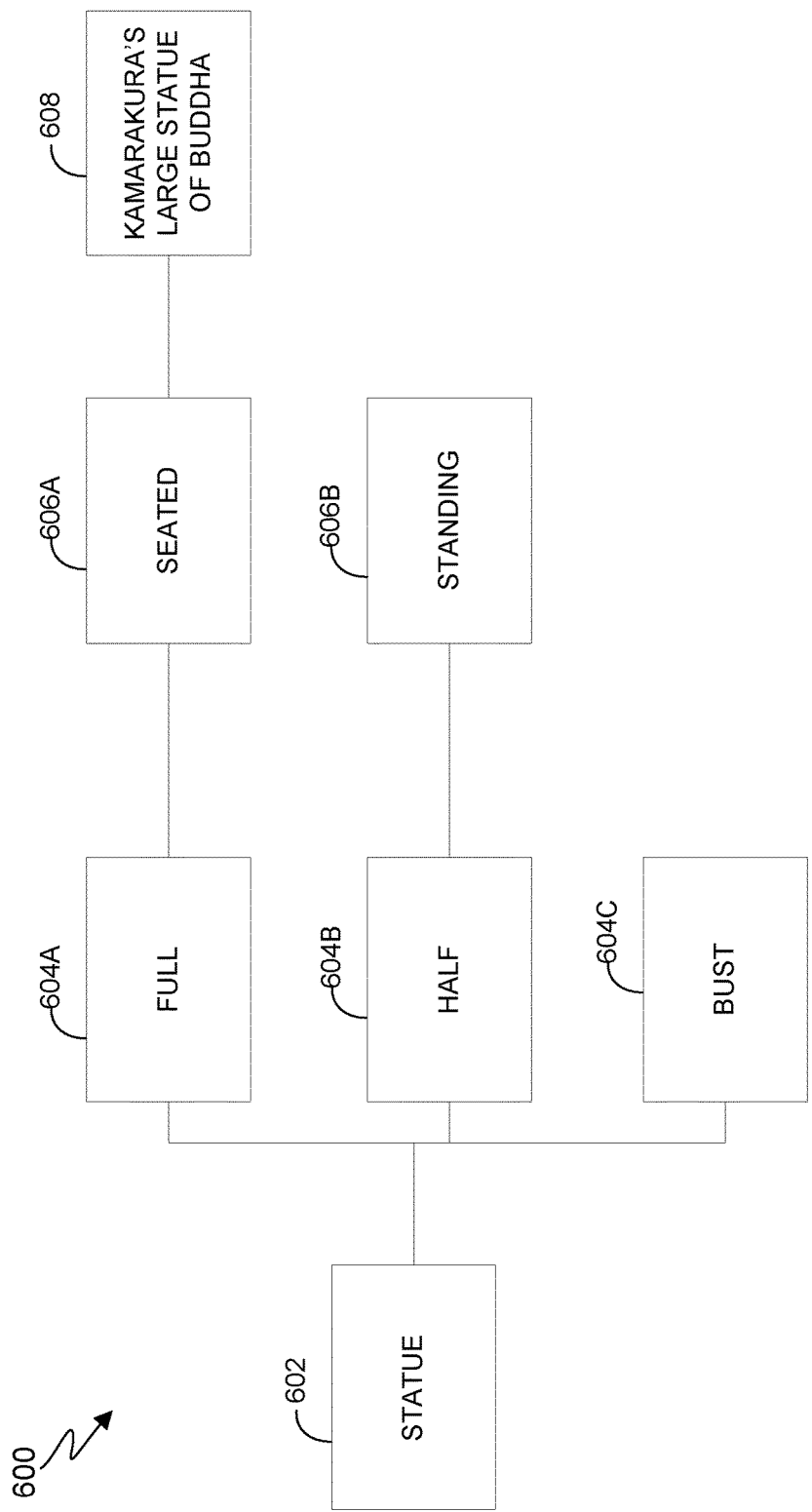
FIG. 6 is an example taxonomy tree for extracting keywords from a language, when there are no equivalent translations from one language to a second language, in accordance with an embodiment of the present invention.

FIG. 6 is an example taxonomy tree 600 for extracting keywords from a language, when there are no equivalent translations from one language to a second language, in accordance with an embodiment of the present invention.

Taxonomy tree 600 depicts keywords 602, 604A-C, 606A-B, and 608. In this example, a native English speaker is in Japan as the destination country. Navigation program 134 receives information about a landmark (e.g., Kamarakura's large statue of Buddha, a landmark located in Japan). Keywords related to the landmark are extracted by navigation program 134 in both English (i.e., the native language) and Japanese (i.e., the destination language). In this example, many Japanese words are related to the landmark, however, there are no English results which are equivalent translations of the Japanese words. Thus, navigation program 134 retrieves abstract keywords related to the destination language keywords (i.e., step 230 of FIG. 2C). In this example, keyword 602 "statute" may be extracted as an abstract keyword. Further the abstract keywords 604A-C of "full", "half", and "bust" may be extracted and branch off of keyword 602, to show their inferred relationship to keyword 602. The abstract keywords 606A and 606B of "seated" and "standing", respectively, may also be extracted and placed in their inferred relationship to the already extracted words (e.g., "seated" evolves from "full" and "statue" and "standing" evolves from "half" and "statue"). Finally, one such abstract keyword in the destination language can be translated to 'seated statue' in the native language of the user. Navigation program 134 can recognize that the phrase 'seated statue' may be recognizable to a native English speaker as describing the particular landmark 608, and can be a candidate for a navigation keyword, which can be used to direct the user to the particular landmark 608.

Figure 7:
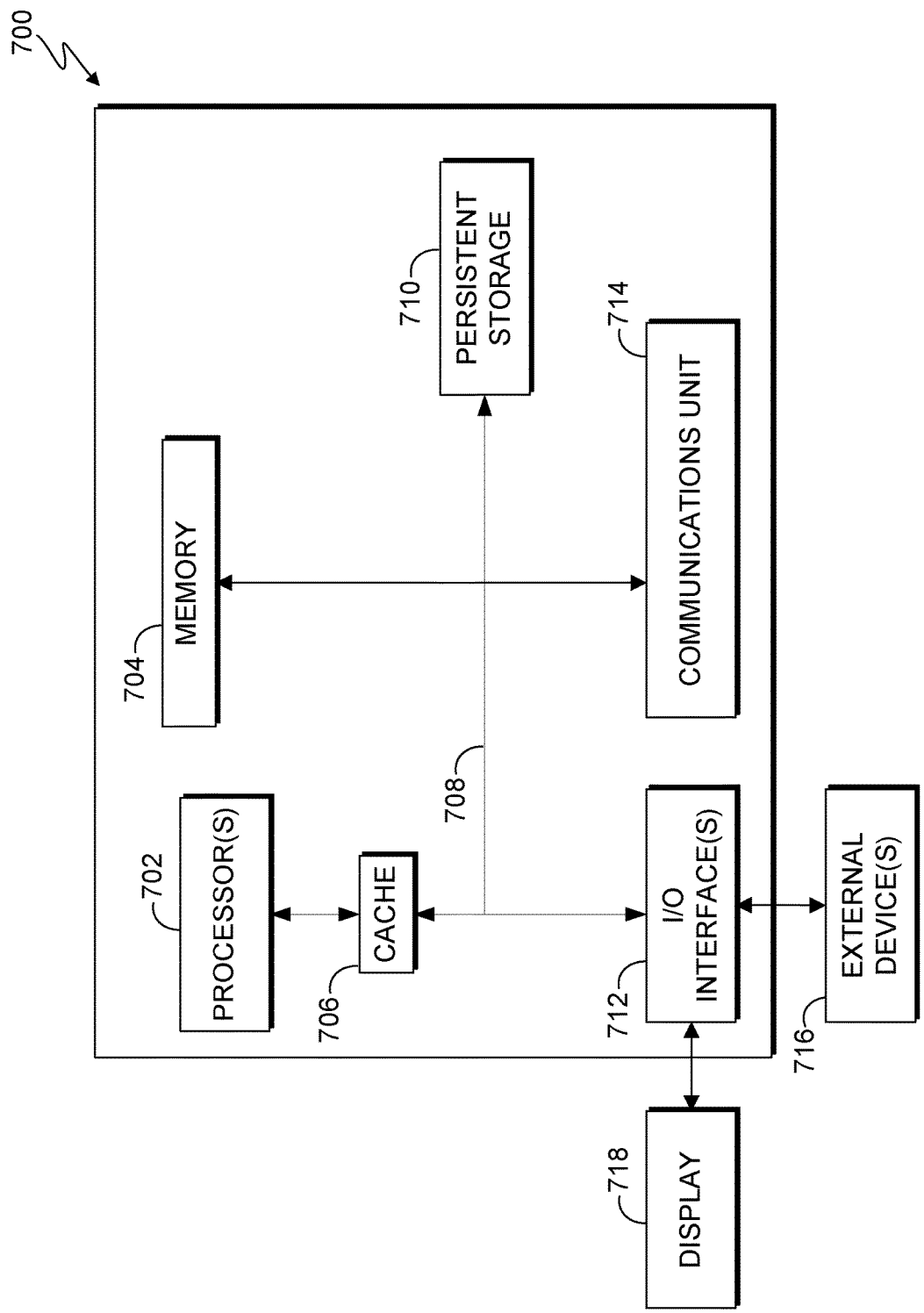
FIG. 7 depicts a block diagram of components of a computing device, in accordance with an embodiment of the present invention.

FIG. 7 is a block diagram of internal and external components of a computing device, generally designated 700, which is representative of the computing devices of FIG. 1, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Computing device 700 includes communications fabric 708, which provides communications between computer processor(s) 702, memory 704, cache 706, persistent storage 710, communications unit 714, and input/output (I/O) interface(s) 712. Communications fabric 708 can be implemented with any architecture designed for passing data and/or control information between processors (such as microprocessors, communications and network processors, etc.), system memory, peripheral devices, and any other hardware components within a system. For example, communications fabric 708 can be implemented with one or more buses.

Memory 704 and persistent storage 710 are computer-readable storage media. In this embodiment, memory 704 includes random access memory (RAM). In general, memory 704 can include any suitable volatile or non-volatile computer readable storage media. Cache 706 is a fast memory that enhances the performance of processors 702 by holding recently accessed data, and data near recently accessed data, from memory 704.

Program instructions and data used to practice embodiments of the present invention may be stored in persistent storage 710 and in memory 704 for execution by one or more of the respective processors 702 via cache 706. In an embodiment, persistent storage 710 includes a magnetic hard disk drive. Alternatively, or in addition to a magnetic hard disk drive, persistent storage 710 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 710 may also be removable. For example, a removable hard drive may be used for persistent storage 710. Other examples include optical and magnetic disks, thumb drives, and smart cards that are inserted into a drive for transfer onto another computer readable storage medium that is also part of persistent storage 710.

Communications unit 714, in these examples, provides for communications with other data processing systems or devices, including resources of network 110. In these examples, communications unit 714 includes one or more network interface cards. Communications unit 714 may provide communications through the use of either or both physical and wireless communications links. Program instructions and data used to practice embodiments of the present invention may be downloaded to persistent storage 710 through communications unit 714.

I/O interface(s) 712 allows for input and output of data with other devices that may be connected to computing device 700. For example, I/O interface 712 may provide a connection to external devices 716 such as a keyboard, keypad, a touch screen, and/or some other suitable input device. External devices 716 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 710 via I/O interface(s) 712. I/O interface(s) 712 also connect to a display 718.

Display 718 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for internationalization of navigation, the method comprising:
   receiving, by one or more processors, from a requestor, a request comprising a target destination and a native language;
   retrieving, by one or more processors, from a database, a plurality of keywords, wherein the plurality of keywords are associated with the native language and a destination language;
   scoring, by one or more processors, each of the plurality of keywords;
   determining, by one or more processors, whether a score associated with each of the plurality of keywords exceeds a threshold value;
   responsive to determining that a score associated with each of the plurality of keywords exceeds the threshold value, translating, by one or more processors, the plurality of keywords from the destination language to the native language;
   sending, by one or more processors, the translated plurality of keywords to the requestor, wherein the translated plurality of keywords are used to navigate to the target destination;
   navigating, by one or more processors, to the target destination using GPS signals and the translated plurality of keywords;
   receiving, by one or more processors, location information associated with a destination;
   retrieving, by one or more processors, social media data associated with the destination, based on a native language of a user;
   extracting, by one or more processors, a set of keywords associated with the destination;
   translating, by one or more processors, the set of keywords associated with the destination to the native language; and
   storing, by one or more processors, the translated set of keywords associated with the destination, in a database.

2. The method of claim 1, further comprising:
   responsive to determining that a score associated with each of the plurality of keywords does not exceed the threshold value, retrieving, by one or more processors, from the plurality of keywords, a set of abstract keywords in the destination language; and
   translating, by one or more processors, the set of abstract keywords in the destination language to the native language, wherein the translated set of abstract keywords are used to navigate to the target destination.

3. The method of claim 1, further comprising:
   retrieving, by one or more processors, from the database, a set of keywords related to the native language of the user;

retrieving, by one or more processors, from the database, a set of criteria associated with the set of keywords related to the native language of the user; and calculating, by one or more processors, a navigation value for the set of keywords, wherein the navigation value is based in part on the native language of the user.

4. The method of claim 1, wherein scoring each of the plurality of keywords comprises:

retrieving, by one or more processors, a level of recognition of the plurality of keywords and a level of relevance of the plurality of keywords, wherein the level of recognition of the plurality of keywords is based in part on the native language of a user; and generating, by one or more processors, a list of results, wherein each keyword from the list of results is associated with a recognition value score.

5. The method of claim 1, further comprising:

ranking, by one or more processors, the translated plurality of keywords, based on an order of familiarity to a user; and implementing, by one or more processors, a set of high ranked keywords as navigation keywords to navigate to the target destination.

6. The method of claim 1, further comprising:

translating, by one or more processors, a plurality of visual features into a plurality of corresponding keywords, based in part on map information and social media data.

* * * * *